Jan. 3, 1928.  
E. K. HEMMING  
1,654,876  
FISHING POLE HOLDER  
Filed April 3, 1926
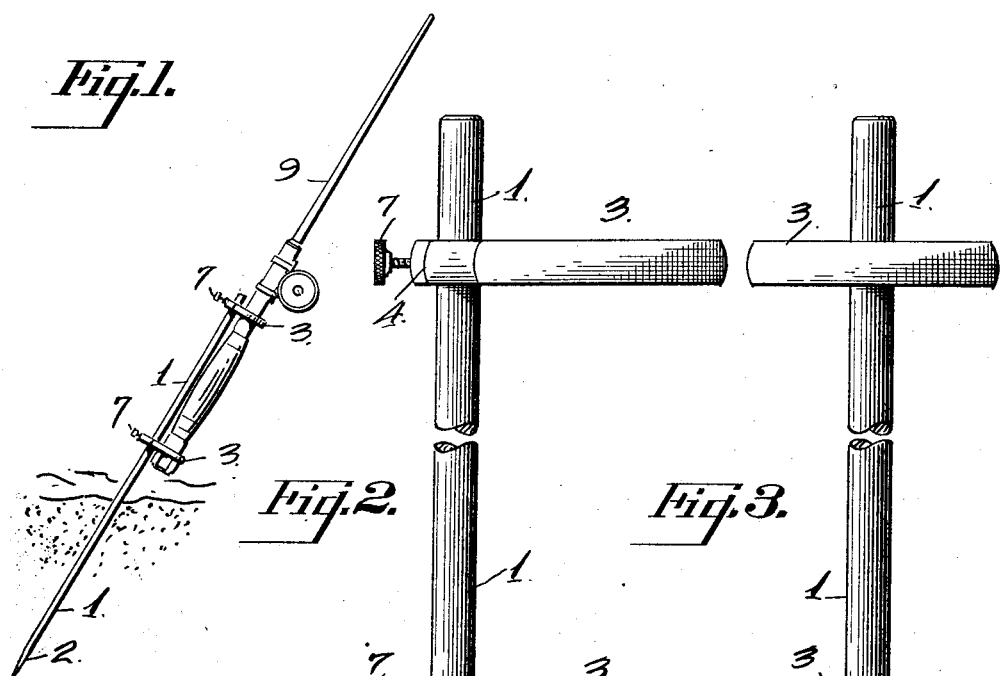
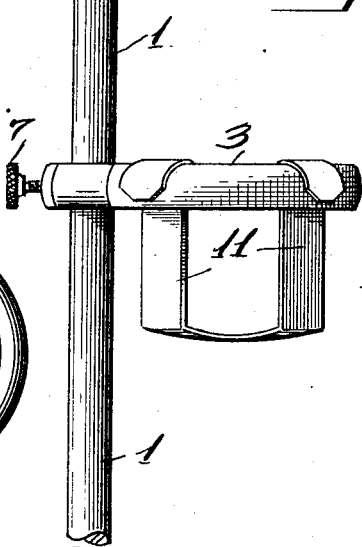
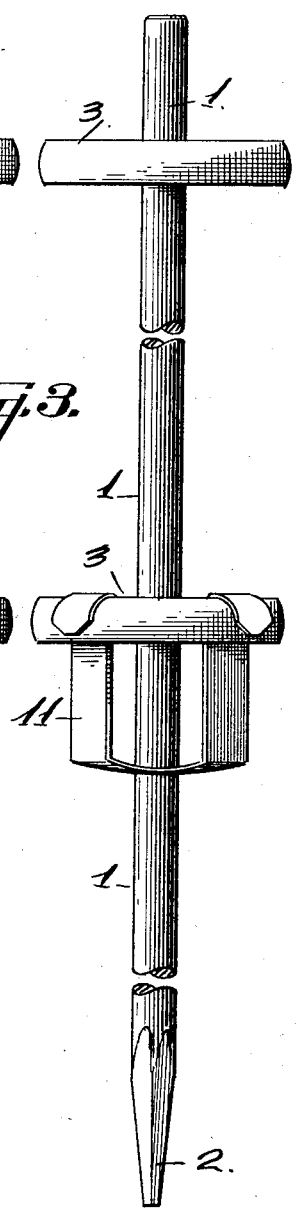
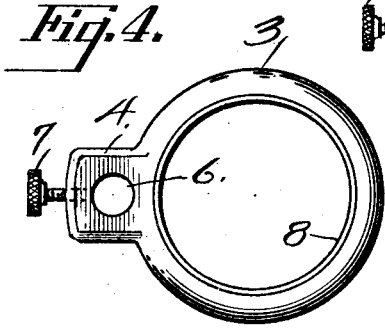
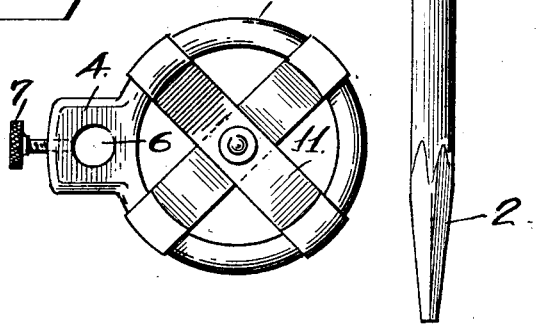
INVENTOR.  
EDWARD K. HEMMING.  
By Arthur L. Slee.  
ATTY Patented Jan. 3, 1928.

1,654,876

UNITED STATES PATENT OFFICE.

EDWARD K. HEMMING, OF SAN FRANCISCO, CALIFORNIA.

FISHING-POLE HOLDER.

Application filed April 3, 1926. Serial No. 99,512.

My invention relates to a new article of manufacture, comprising a fishing pole holder, wherein a pointed rod, arranged for insertion in the soil, operates in conjunction with a pair of rings adjustly mounted upon said rod for engaging said fishing pole near the butt end thereof, to retain said pole in an approximately upright position; one of said rings being provided with a socket or cup to engage the butt end of said pole, and thereby prevent longitudinal movement in one direction of said pole through said rings.

The primary object of the present invention is to provide a new and improved article of manufacture.

Another object is to provide a new and improved article of manufacture, comprising a fishing pole holder, which is arranged to be easily and readily disassembled, and as easily and readily assembled for operative purposes.

A further object is to provide a new and improved device of the character described, having few parts of simple and economic construction, which may be easily packed within a comparatively small compass when not in use or for transportation purposes.

A still further object is to provide an improved device of the type set forth, which may be stuck into the ground or soil and effectively retain a fishing pole in an approximately upright position.

I accomplish these and other objects by means of the improved device disclosed in the drawings forming a part of the present specification, wherein like characters of reference are used to designate similar parts throughout the said specifications and drawings, and in which, Fig. 1 is a view disclosing the manner in which my improved holder is applied to hold a fishing pole in an approximately upright position;

Fig. 2 is a broken side elevation of the device;

Fig. 3 is a broken front elevation;

Fig. 4 is a plan view of the upper ring removed from the rod.

Fig. 5 is a similar view of the lower ring with its cup or socket.

Referring to the drawings, the numeral 1 is used to designate a rod having its lower end 2 pointed to facilitate insertion of said rod into the earth or soil, whereby said rod may be maintained in an approximately upright position, or at a suitable angle, as disclosed in Fig. 1 of drawings.

A pair of rings 3 are each provided with a lateral extension 4, having an aperture 6 therein to slidably receive the rod 1; said extension 4 being also provided with suitable thumb screws 7, arranged to intersect the apertures 6 and by engaging the rod 1 therein rigidly and adjustably connect said rings 2 to the rod 1, as disclosed in Fig. 2 of the drawings.

The upper ring 3 is provided on its internal periphery with a suitable cushion 8, which may be composed of a felt or leather band to prevent chafing expansive fishing poles 9 held therein.

The lower ring is arranged intermediate the upper ring 3 and the pointed end 2 of said rod 1, and is provided with a socket or cup 11, composed of two members secured at right angles to each other and bent to form a cup, the upper ends of said members being bent around the lower ring to secure the said cup to said ring.

The cups 3 are adjustably and slidably mounted upon the rod 1, and are secured in any desired spaced relation, by means of the thumb screws 7. When assembled for use, the pointed end 2 of the rod is inserted or struck into the earth or soil at the required angle, or in an approximately upright position, as desired, and the butt end of the fishing pole 9 is passed through the upper ring until said butt end rests within the cup 11. The upper ring 3 and its internal cushion 8 will then engage the pole 9 adjacent the handle thereof, while the butt end will rest within the cup 11 and thereby be effectively retained in the required position without manual assistance.

When not in use the rings 3 may be readily and easily detached from the rod 1 and carried within the pocket, while the rod 1 itself may be wrapped with the fishing pole, thereby requiring a minimum amount of space when not in use or when being transported. It is obvious that it may be as easily and readily reassembled when required for use.

Having thus described my invention what I claim as new and desire to secure by Letters Patent is:

1. A fishing pole holder comprising a pair of rings arranged to engage a fishing pole adjacent the butt thereof, and having apertured lateral extensions; a rod slidably mounted within the apertures of said extensions; and means mounted within said extensions for rigidly engaging the rod to hold said rings in proper spaced relation to each other to engage and hold said fishing pole near the butt thereof; and a cup formed of two members arranged at right angles to each other and inserted within one of said rings to engage and hold the butt end of said fishing pole.

2. A fishing pole holder comprising a pointed rod; a pair of rings adjustably and detachably mounted upon said rod; a cushion mounted within one of said rings to prevent chafing of a fishing pole held therein; and a suitable cup mounted within the other ring to engage and retain the butt end of said fishing pole, whereby the same may be held in an approximately upright position.

In witness whereof, I hereunto set my signature.

EDWARD K. HEMMING.